United States Patent
Jean

(10) Patent No.: US 8,392,584 B2
(45) Date of Patent: Mar. 5, 2013

(54) SYSTEM AND METHOD FOR SEARCHING FOR SESSION ID IN WIRELESS MOBILE IP COMMUNICATION SYSTEM

(75) Inventor: Sung-Kee Jean, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 12/414,025

(22) Filed: Mar. 30, 2009

(65) Prior Publication Data

US 2009/0254668 A1 Oct. 8, 2009

(30) Foreign Application Priority Data

Apr. 3, 2008 (KR) ........................ 10-2008-0031031

(51) Int. Cl.
  *G06F 15/16* (2006.01)
  *H04W 4/00* (2009.01)
  *H04W 36/00* (2009.01)
  *H04W 60/00* (2009.01)
(52) U.S. Cl. ..... 709/228; 709/227; 370/351; 370/395.2; 455/432.1; 455/435.1; 455/455
(58) Field of Classification Search .................. 709/245, 709/249, 227–230, 238–244; 370/310, 331, 370/328, 338, 351–356, 395.2, 400, 401; 455/410, 435.1, 432.1, 432.2, 432.3, 433, 455/436–445
See application file for complete search history.

(56) References Cited

U.S. PATENT DOCUMENTS

| | | | |
|---|---|---|---|
| 6,522,880 B1 * | 2/2003 | Verma et al. ................... | 455/436 |
| 6,571,289 B1 * | 5/2003 | Montenegro ................... | 709/227 |
| 6,917,605 B2 * | 7/2005 | Kakemizu et al. ............. | 370/338 |
| 6,963,582 B1 * | 11/2005 | Xu ................................. | 370/466 |
| 6,978,317 B2 * | 12/2005 | Anantha et al. ............... | 709/249 |
| 7,079,499 B1 * | 7/2006 | Akhtar et al. ................. | 370/310 |
| 7,080,151 B1 * | 7/2006 | Borella et al. ................. | 709/230 |
| 7,107,620 B2 * | 9/2006 | Haverinen et al. .............. | 726/29 |
| 7,152,238 B1 * | 12/2006 | Leung et al. ...................... | 726/2 |
| 7,224,673 B1 * | 5/2007 | Leung et al. .................. | 370/328 |
| 7,366,509 B2 * | 4/2008 | Akgun et al. ............... | 455/435.1 |
| 7,395,336 B1 * | 7/2008 | Santharam et al. ........... | 709/227 |
| 7,457,897 B1 * | 11/2008 | Lee et al. ......................... | 710/74 |
| 7,512,796 B2 * | 3/2009 | Haverinen et al. ............ | 713/168 |
| 7,561,549 B2 * | 7/2009 | Meier et al. ................... | 370/331 |
| 7,675,917 B2 * | 3/2010 | Ju et al. ...................... | 370/395.3 |
| 8,036,662 B2 * | 10/2011 | Watanabe et al. ............. | 455/436 |
| 2001/0053694 A1 * | 12/2001 | Igarashi et al. ............... | 455/433 |
| 2002/0147837 A1 * | 10/2002 | Heller ........................... | 709/238 |
| 2003/0067923 A1 * | 4/2003 | Ju et al. ...................... | 370/395.3 |
| 2003/0217180 A1 * | 11/2003 | Chandra et al. ............... | 709/245 |
| 2004/0260752 A1 * | 12/2004 | Chandra et al. ............... | 709/200 |
| 2005/0177647 A1 * | 8/2005 | Anantha et al. ............... | 709/249 |
| 2006/0073840 A1 * | 4/2006 | Akgun et al. ............... | 455/456.3 |

(Continued)

*Primary Examiner* — Tae Kim

(74) *Attorney, Agent, or Firm* — Jefferson IP Law, LLP

(57) ABSTRACT

A system and a method for performing session setup in a wireless communication system that uses a Mobile Internet Protocol (MIP) are provided. In the method, when at least one Mobile Node (MN) requests registration, a Network Access Identifier (NAI) of the MN is determined. A session Identification (ID) is assigned to the NAI of the MN. The session ID assigned to the NAI is inserted into an Identification Low field forming a registration request field of a message requesting registration of the MN. The message is transmitted to a Home Agent (HA) of the MN. A Foreign Agent (FA) can more easily search for an MN corresponding to a registration reply message provided from the HA, and memory consumption and a time delay that occurs due to a hash method may be reduced.

14 Claims, 7 Drawing Sheets

U.S. PATENT DOCUMENTS

| | | | |
|---|---|---|---|
| 2006/0140149 A1* | 6/2006 | Kim et al. | 370/331 |
| 2006/0143098 A1* | 6/2006 | Lazaridis | 705/34 |
| 2006/0251044 A1* | 11/2006 | Haddad | 370/349 |
| 2007/0060106 A1* | 3/2007 | Haverinen et al. | 455/410 |
| 2007/0086382 A1* | 4/2007 | Narayanan et al. | 370/331 |
| 2007/0086383 A1* | 4/2007 | Watanabe et al. | 370/331 |
| 2007/0189255 A1* | 8/2007 | Navali et al. | 370/338 |
| 2007/0275716 A1* | 11/2007 | Lee et al. | 455/433 |
| 2009/0092095 A1* | 4/2009 | Hata et al. | 370/331 |
| 2009/0132817 A1* | 5/2009 | Zhao | 713/168 |
| 2009/0248708 A1* | 10/2009 | Balasubramanian et al. | 707/100 |
| 2009/0254668 A1* | 10/2009 | Jean | 709/228 |

* cited by examiner

MIP REGISTRATION REPLY FORMAT

| IP HEADER (500) |
|---|
| UDP HEADER (510) |
| REGISTRATION REQUEST (520) |
| NAI EXTENSION (530) |
| ADDITIONAL INFORMATION (540) |

FIG.5A

| TYPE | S | B | D | M | G | R | T | X | LIFETIME |
|---|---|---|---|---|---|---|---|---|---|
| HOME ADDRESS (550) | | | | | | | | | |
| HOME AGENT (560) | | | | | | | | | |
| CARE-OF-ADDRESS (570) | | | | | | | | | |
| IDENTIFICATION HIGH(32 BITS)/LOW(32 BITS) (580) | | | | | | | | | |
| EXTENSIONS...(ADDITIONAL INFORMATION) | | | | | | | | | |

FIG.5B

MIP REGISTRATION REPLY FORMAT

| IP HEADER (600) |
| --- |
| UDP HEADER (610) |
| REGISTRATION REPLY (620) |
| NAI EXTENSION (630) |
| ADDITIONAL INFORMATION (640) |

FIG.6A

| TYPE | CODE | LIFETIME |
| --- | --- | --- |
| HOME ADDRESS (650) | | |
| HOME AGENT (660) | | |
| IDENTIFICATION HIGH(32 BITS)/LOW(32 BITS) (670) | | |
| EXTENSIONS...(ADDITIONAL INFORMATION) | | |

FIG.6B

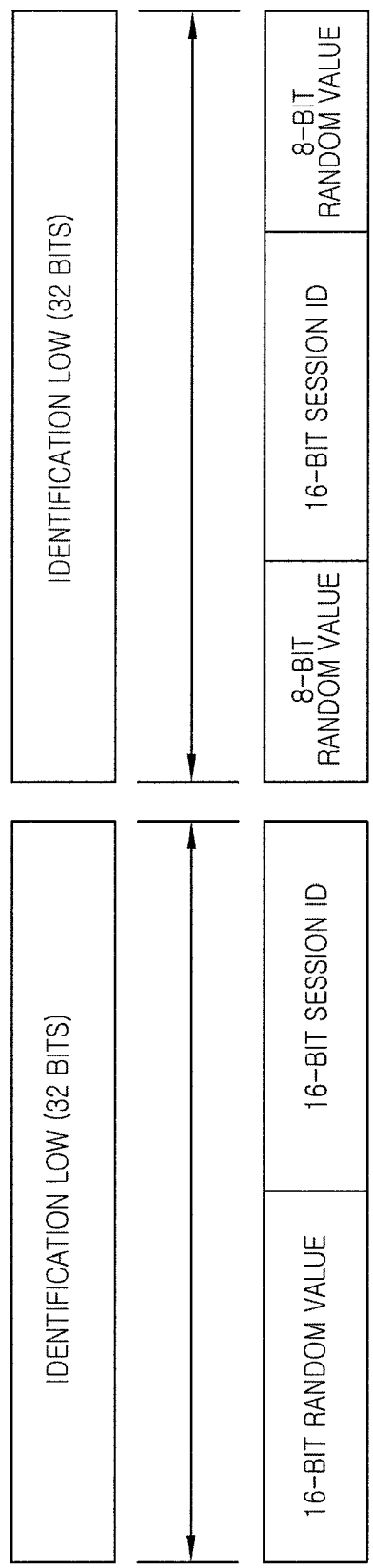

US 8,392,584 B2

SYSTEM AND METHOD FOR SEARCHING FOR SESSION ID IN WIRELESS MOBILE IP COMMUNICATION SYSTEM

PRIORITY

This application claims the benefit under 35 U.S.C. §119 (a) of a Korean patent application filed in the Korean Intellectual Property Office on Apr. 3, 2008 and assigned Serial No. 10-2008-0031031, the entire disclosure of which is hereby incorporated by reference.

BACKGROUND OF THE INVENTION

1. Field of the Invention

The present invention relates to a wireless communication system using a Mobile Internet Protocol (MIP). More particularly, the present invention relates to a system and a method for processing an MIP session setup at a Foreign Agent (FA) of a wireless communication system.

2. Description of the Related Art

A wireless communication system using a Foreign agent Care-of-Address (FaCoA) Mobile Internet Protocol (MIP) service performs an MIP session setup procedure in order to register a Mobile Node (MN). For example, a wireless communication system performs an MIP session setup procedure as illustrated in FIG. 1 in order to register a client MIP node.

FIG. 1 illustrates a session setup procedure of a client MIP node in a conventional wireless communication system.

As illustrated in FIG. 1, in the case where an MN 100 accesses a Foreign Agent (FA) 110, the MN 100 transmits a Mobile Internet Protocol (MIP) registration request message to the FA 110 in step 131.

When the MIP registration request message is received, the FA 110 generates a hash table for a Network Access Identifier (NAI) of the MN 100 in step 133. For example, the FA 110 assigns a session IDentification (ID) to the NAI of the MN 100. In addition, the FA 110 generates a hash key of the MN 100 by performing a hash algorithm on the NAI of the MN 100. At this point, the FA 110 generates the hash table by assigning the session ID assigned to the NAI to the hash key of the MN 100.

The FA 110 transmits an MIP registration request message to a Home Agent (HA) 120 in order to register the MN 100 in step 135. When a plurality of MNs transmit MIP registration request messages in step 131, the FA 110 transmits an MIP registration request message of each MN to the HA 120.

When an MIP registration request message is received from the FA 110, the HA 120 generates a binding cache for the MN 100 in step 137. In the case where the binding cache for the MN 100 has been already generated, the HA 120 updates the binding cache for the MN 100.

The HA 120 transmits an MIP registration reply message informing registration information of the MN 100 to the FA 110 in step 139.

When the MIP registration reply message is received from the HA 120, the FA 110 searches for an NAI included in the MIP registration reply message from the hash table, and determines an MN corresponding to the MIP registration reply message in step 141. For example, the FA 110 generates a hash key by performing a hash algorithm on the NAI included in the MIP registration reply message. The FA 110 determines a session ID assigned to the generated hash key from the hash table, and determines an MN corresponding to the NAI assigned the determined session ID.

When the MN 100 is determined by searching for the NAI from the hash table, the FA 110 transmits the MIP registration reply message to the MN 100 in order to inform that the MN 100 has been properly registered in the HA 120 in step 143.

For another example, the wireless communication system performs an MIP session setup procedure as illustrated in FIG. 2 in order to register a proxy MIP node.

FIG. 2 illustrates a session setup procedure of the proxy MIP node in a conventional wireless communication system.

In the case where an MN 200 accesses an FA 210, the MN 200 transmits a Dynamic Host Configuration Protocol (DHCP) discover message to the FA 210 in order to request an Internet Protocol (IP) address in step 231.

When the DHCP discover message is received from the MN 200, the FA 210 generates a hash table for an NAI of the MN 200 in step 233. For example, the FA 210 assigns a session ID to the NAI of the MN 200. In addition, the FA 210 generates a hash key of the MN 200 by performing a hash algorithm on the NAI of the MN 200. At this point, the FA 210 generates the hash table by assigning the session ID assigned to the NAI to the hash key of the MN 200. Here, the FA 210 determines the NAI of the MN 200 from an Authentication Authorization and Accounting (AAA) server.

The FA 210 transmits an MIP registration request message to an HA 220 in order to register the MN 200 in step 235. When a plurality of MNs transmit MIP registration request messages, the FA 210 transmits an MIP registration request message of each MN to the HA 220.

When an MIP registration request message is received from the FA 210, the HA 220 generates a binding cache for the MN 200 in step 237. In the case where the binding cache for the MN 200 has already been generated, the HA 220 updates the binding cache for the MN 200.

The HA 220 transmits an MIP registration reply message informing of registration information of the MN 200 to the FA 210 in step 239.

When the MIP registration reply message is received from the HA 220, the FA 210 searches for an NAI included in the MIP registration reply message from the hash table, and determines an MN corresponding to the MIP registration reply message in step 241. For example, the FA 210 generates a hash key by performing a hash algorithm on the NAI included in the MIP registration reply message. The FA 210 determines a session ID assigned to the generated hash key from the hash table, and determines an MN corresponding to the NAI assigned the determined session ID.

When the MN 200 is determined through searching for the NAI from the hash table, the FA 210 includes an IP address assigned to the MN 200 in a DHCP offer message and transmits the DHCP offer message to the MN 200 in step 243.

When the DHCP offer message is received, the MN 200 determines the IP address assigned by the FA 210 from the DHCP offer message. The MN 200 transmits a DHCP request message to the FA 210 in order to confirm the assigned IP address in step 245.

When the DHCP request message is received, the FA 210 transmits a DHCP ACKnowledgment (ACK) message to the MN 200 in response to the DHCP request message in step 247.

As described above, the FA of the wireless communication system which uses an MIP determines an MN corresponding to an NAI included in a MIP registration reply message provided from the HA by searching for the NAI from the hash table.

In this case, a delay occurs for the FA to generate the hash table using the hash algorithm or a search for a session ID included in the hash table. Furthermore, in the case where a plurality of session IDs are assigned to one hash key, a longer delay occurs for the FA to search for an NAI from the hash table.

In addition, the FA stores a hash table in order to maintain mapping information regarding NAIs of MNs requesting registration and corresponding session IDs.

SUMMARY OF THE INVENTION

An aspect of the present invention is to address at least the above-mentioned problems and/or disadvantages and to provide at least the advantages described below. Accordingly, an aspect of the present invention is to provide a system and a method for performing a Mobile Internet Protocol (MIP) session setup in a wireless communication system that uses an MIP.

Another aspect of the present invention is to provide a system and a method for efficiently searching for a session Identification (ID) at a Foreign Agent (FA) of a wireless communication system that uses an MIP.

Still another aspect of the present invention is to provide a system and a method for performing an MIP session setup in order to register a client MIP node in a wireless communication system that uses an MIP.

Yet another aspect of the present invention is to provide a system and a method for performing an MIP session setup in order to register a proxy MIP node in a wireless communication system that uses an MIP.

In accordance with an aspect of the present invention, a method for setting up a session at a FA of a wireless communication system that uses a MIP is provided. The method includes, when at least one Mobile Node (MN) requests registration, determining a Network Access Identifier (NAI) of the MN, assigning a session ID to the NAI of the MN, inserting the session ID assigned to the NAI into an Identification Low field forming a registration request field of a message requesting registration of the MN, and transmitting the message to a Home Agent (HA) of the MN.

In accordance with another aspect of the present invention, a wireless communication system that uses an MIP, for performing a session setup is provided. The system includes an FA for, when at least one MN requests registration, assigning a session ID to an NAI of the MN, for inserting the session ID assigned to the NAI into an Identification Low field forming a registration request field of a message requesting registration of the MN, and for transmitting the message to an HA, and the HA for performing a binding cache for the MN according to registration request information of the MN included in the message provided from the FA, for inserting the session ID of the MN into an Identification Low field forming a registration reply field of a message including registration information of the MN, and for transmitting the message to the FA.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which:

FIGS. 5A and 5B illustrate the construction of a registration request signal in a wireless communication system according to exemplary embodiments of the present invention;

FIGS. 6A and 6B illustrate the construction of a registration reply signal in a wireless communication system according to exemplary embodiments of the present invention; and FIGS. 7A and 7B illustrate an IdLow field in a wireless communication system according to exemplary embodiments of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a technique for performing a Mobile Internet Protocol (MIP) session procedure in a wireless communication system that uses an MIP. More particularly, exemplary embodiments of the present invention provide a technique for increasing a session Identification (ID) searching efficiency of a Foreign Agent (FA) in an MIP session procedure.

In case of using an MIP, a wireless communication system may assign a home address and a care-of-address to a Mobile Node (MN) in order to address mobility of the MN performing communication based on an Internet Protocol (IP). Here, the home address represents a unique address assigned to the MN by a Home Agent (HA) managing registration information of the MN. The care-of-address represents a temporary address assigned to the MN by an external network. That is, in the case where the MN moves to the external network, the external network may assign a care-of-address to the MN in order to provide a service. Therefore, the home address may be maintained even when the MN moves to the external network, but the care-of-address may be newly assigned by the external network to which the MN moves.

In the case where the MN moves to the external network in a wireless communication system, the MN may be assigned a care-of-address by an FA of the external network.

Figure 1:
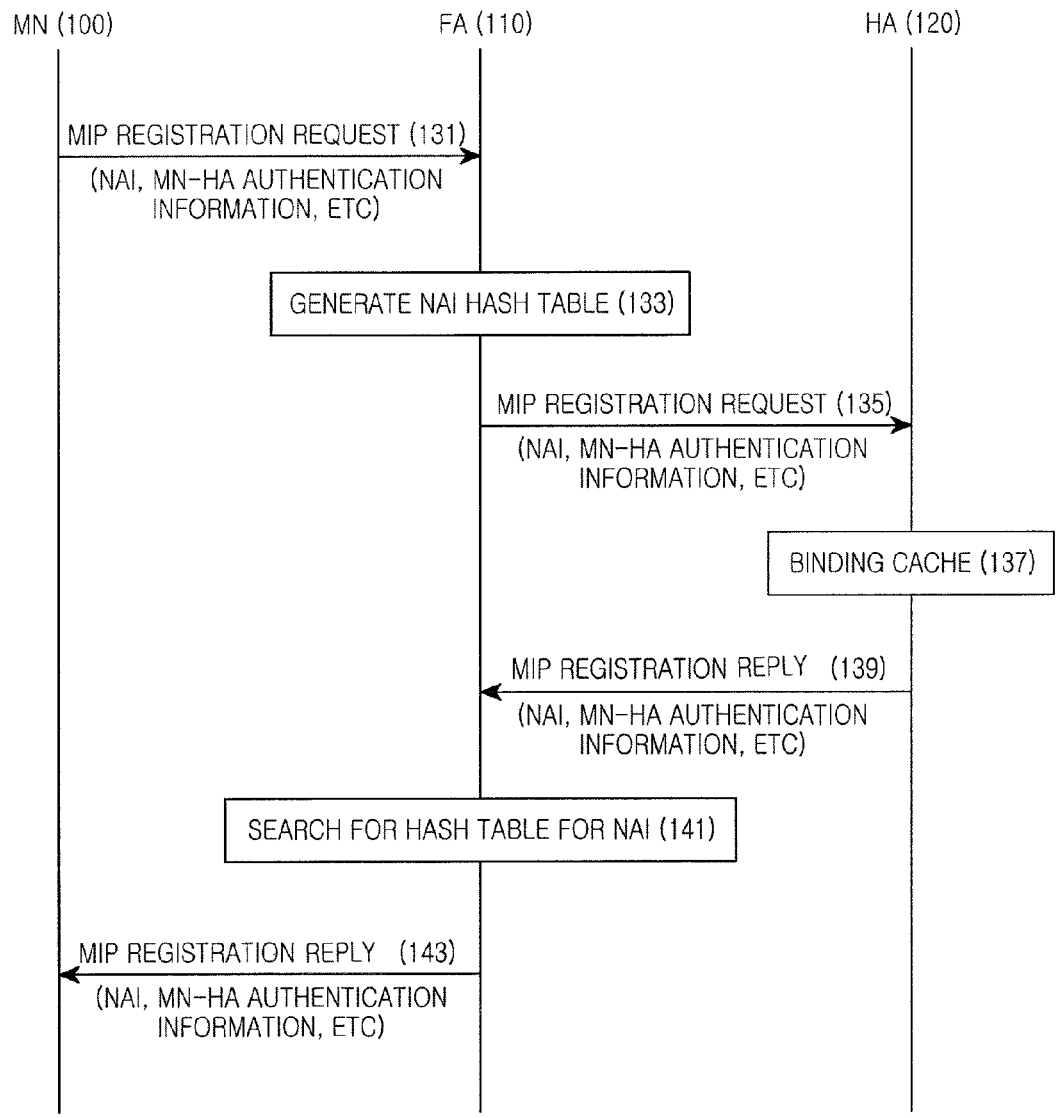
FIG. 1 illustrates a session setup procedure of a client Mobile Internet Protocol (MIP) node in a conventional wireless communication system.
Figure 2:
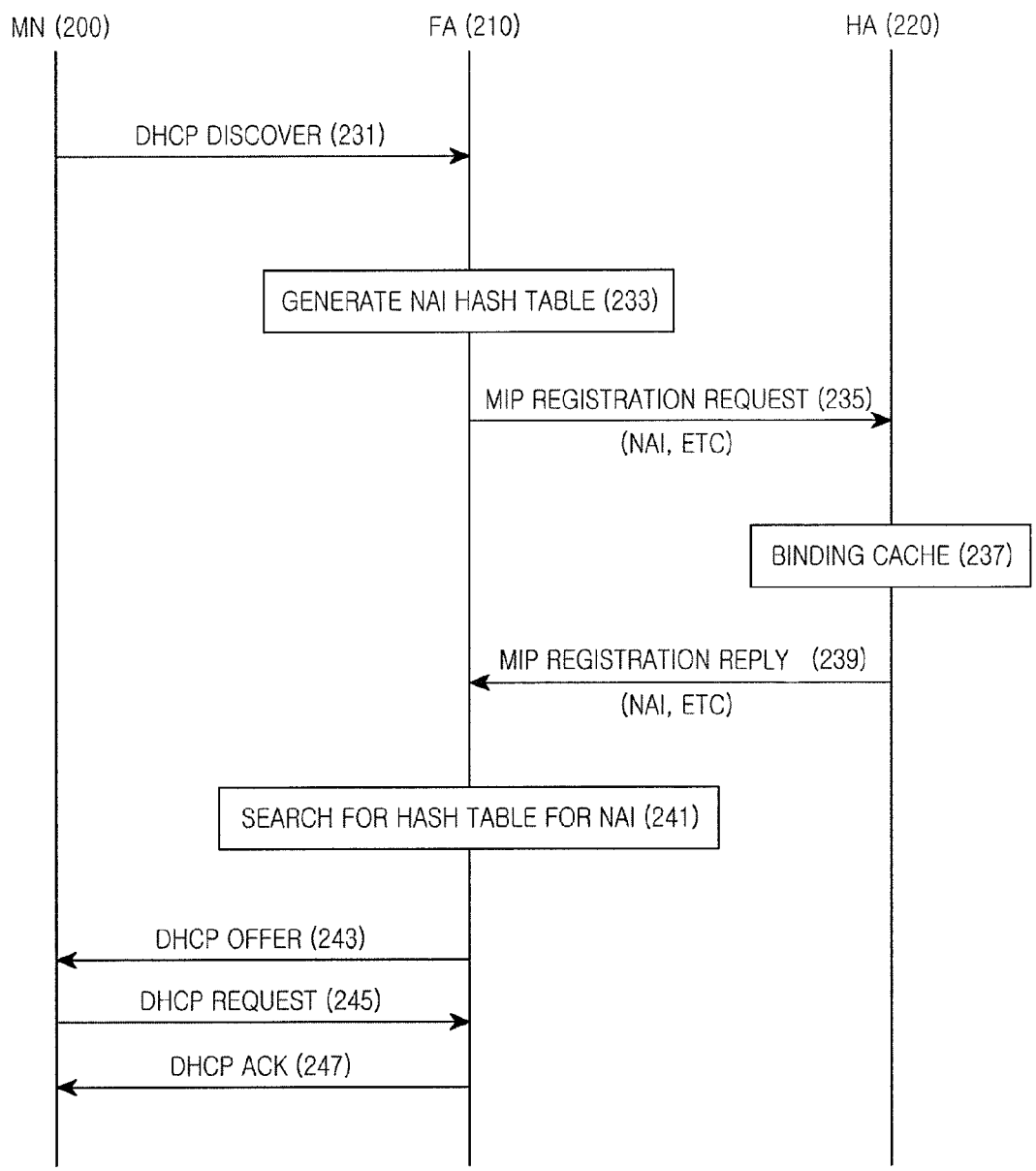
FIG. 2 illustrates a session setup procedure of a proxy MIP node in a conventional wireless communication system.
Figure 3:
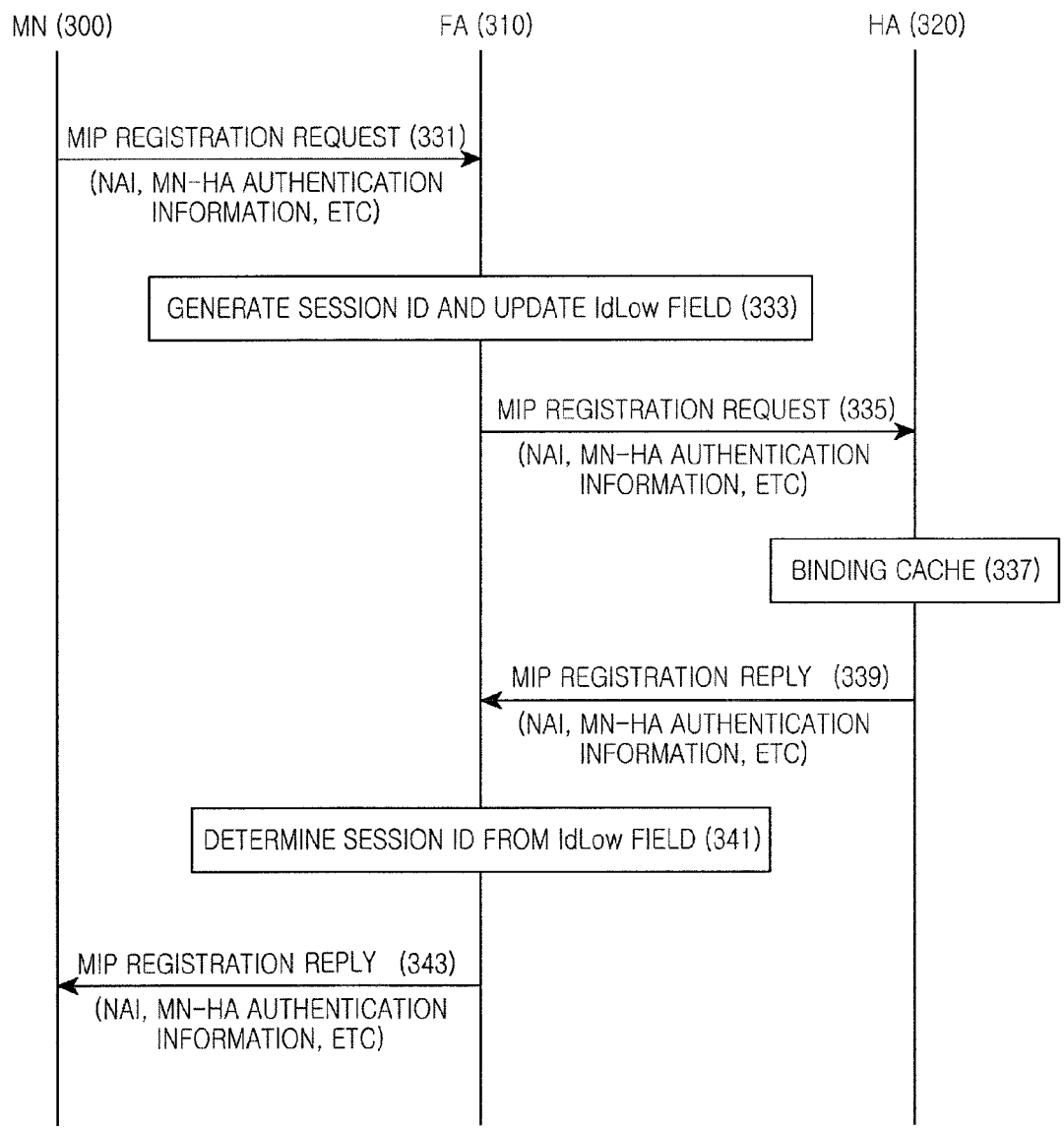
FIG. 3 illustrates a session setup procedure of a client MIP node in a wireless communication system according to an exemplary embodiment of the present invention.

At this point, the wireless communication system may perform a session setup procedure for the MN so that communication may be performed using the home address of the MN and the care-of-address assigned by the FA. For example, the wireless communication system may perform a session setup procedure regarding client MIP node registration as illustrated in FIG. 3. Here, a client MIP node may be an MN recognizing use of an MIP.

FIG. 3 illustrates a session setup procedure of a client MIP node in a wireless communication system according to an exemplary embodiment of the present invention.

Referring to FIG. 3, the wireless communication system may include an MN 300, an FA 310, and an HA 320.

When the MN 300 accesses the FA 310, the MN 300 may transmit an MIP registration request message to the FA 310 in step 331. At this point, the MIP registration request message may include a Network Access Identifier (NAI) of the MN and authentication information between the MN 300 and the HA 320.

The FA 310 may assign a session ID to the NAI of the MN 300 determined from the MIP registration request message. In the case where MIP registration request messages are received from a plurality of MNs, the FA 310 may assign different session IDs to NAIs of the MNs, respectively. At this point, the FA 310 may control a session ID assigned to an NAI of each MN to be increased.

The FA 310 may insert the session ID of the MN 300 into the MIP registration request message to be transmitted to the HA 320 in order to register the MN 300 in step 333. For example, the FA 310 may insert the session ID of the MN 300 into an IdLow field of the MIP registration request message.

The FA 310 may transmit the MIP registration request message including the session ID of the MN 300 to the HA 320 in step 335. In the case where a plurality of MNs transmit MIP registration request messages, the FA 310 may transmit an MIP registration request message for each MN to the HA 320. At this point, the MIP registration request message may include the NAI of the MN, authentication information between the FA 310 and the HA 320, and the session ID of the MN 300.

When the MIP registration request message is received from the FA 310, the HA 320 may generate a binding cache for the MN 300 in step 337. In the case where the binding cache for the MN 300 has already been generated, the HA 320 may update the binding cache for the MN 300. Here, the binding cache refers to an operation of mapping the care-of-address included in the MIP registration request message provided from the FA 310 and the home address of the MN 300 so that the MN 300 which has moved to the FA 310 may perform communication using the home address and the care-of-address.

The HA 320 may transmit an MIP registration reply message informing of registration information of the MN 300 to the FA 310 in step 339. At this point, the HA 320 may insert a session ID of the MN 300 into the MIP registration reply message. For example, the HA 320 may copy an IdLow field value of the MIP registration request message provided from the FA 310 to an IdLow field value of the MIP registration reply message.

When the MIP registration reply message is received from the HA 320, the FA 310 may determine the MN corresponding to the MIP registration reply message by determining the session ID included in the MIP registration reply message in step 341. For example, the FA 310 may determine the session ID from the IdLow field of the MIP registration reply message. The FA 310 may recognize the MN corresponding to the NAI to which the session ID is assigned as an MN corresponding to the MIP registration reply message.

In the case where the MN corresponding to the MIP registration reply message is the MN 300, the FA 310 may transmit an MIP registration reply message to the MN 300 in order to inform that the MN 300 has been correctly registered in the HA 320 in step 343.

The above exemplary embodiment describes the session setup procedure for a client MIP node in a wireless communication system.

Figure 4:
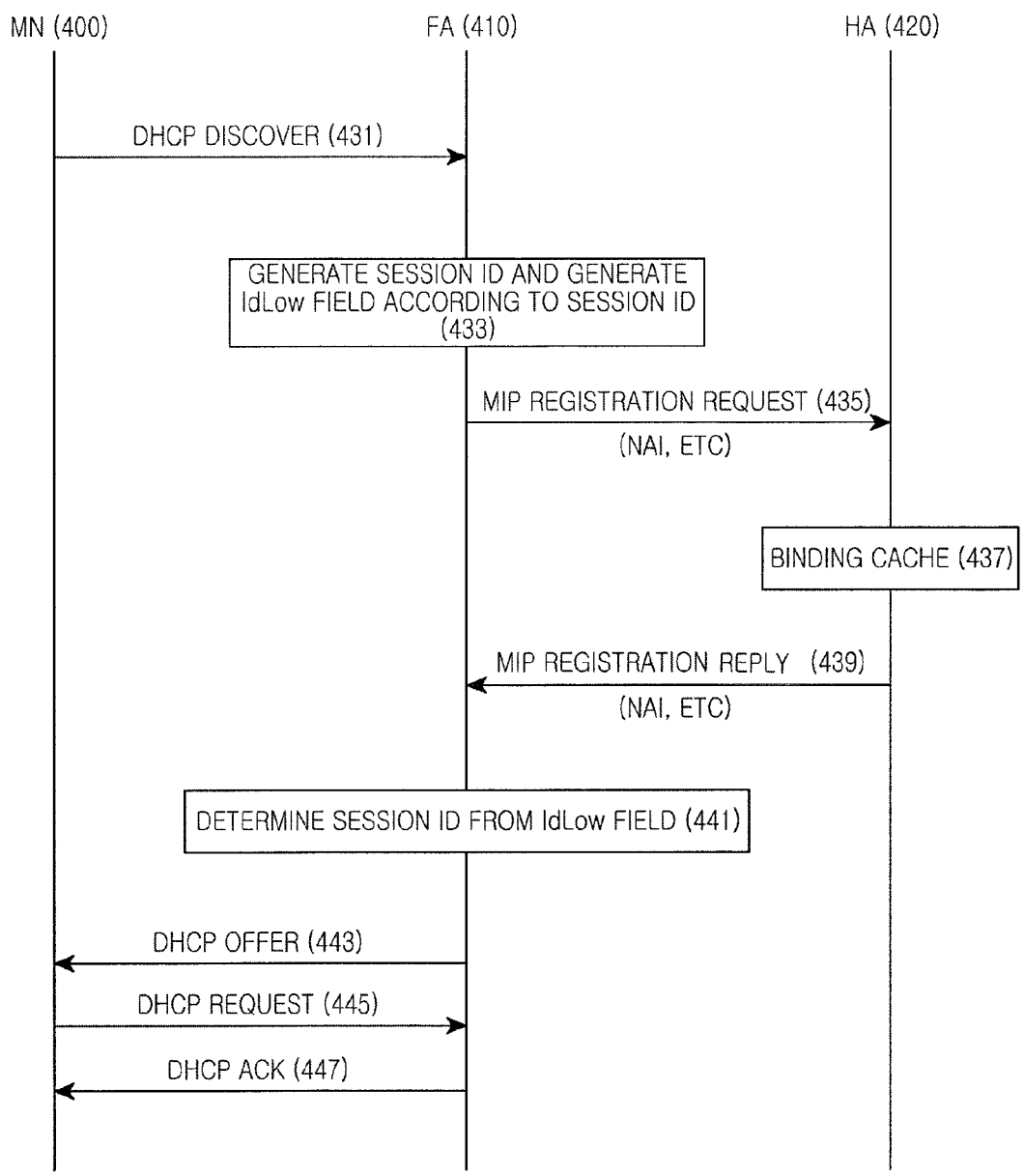
FIG. 4 illustrates a session setup procedure of a proxy MIP node in a wireless communication system according to an exemplary embodiment of the present invention.

In another exemplary embodiment, a wireless communication system may perform a session setup procedure for a proxy MIP node as illustrated in FIG. 4. Here, the proxy MIP node represents an MN that cannot recognize use of an MIP.

FIG. 4 illustrates a session setup procedure of a proxy MIP node in a wireless communication system according to an exemplary embodiment of the present invention.

Referring to FIG. 4, the wireless communication system may include an MN 400, an FA 410, and an HA 420.

When the MN 400 accesses the FA 410, the MN 400 may transmit a Dynamic Host Configuration Protocol (DHCP) discover message to the FA 410 in order to request an IP address in step 431.

When the DHCP discover message is received from the MN 400, the FA 410 may obtain an NAI of the MN 400 from an Authentication Authorization and Accounting (AAA) server.

The FA 410 may assign a session ID to the NAI of the MN 400, and may insert the session ID of the MN 400 into an MIP registration request message to be transmitted to the HA 420, in step 433, in order to register the MN 400. For example, the FA 410 may insert the session ID of the MN 400 into an IdLow field of the MIP registration request message.

The FA 410 may transmit the MIP registration request message including the session ID of the MN 400 to the HA 420 in step 435. In the case where a plurality of MNs transmit MIP registration request messages, the FA 410 may transmit an MIP registration request message of each MN to the HA 420. At this point, the MIP registration request message may include the NAI of the MN 400 and the session ID of the MN 400.

When the MIP registration request message is received from the FA 410, the HA 420 may generate a binding cache for the MN 400 in step 437. In the case where the binding cache for the MN 400 has already been generated, the HA 420 may update the binding cache for the MN 400.

The HA 420 may transmit an MIP registration reply message informing of registration information of the MN 400 to the FA 410 in step 439. At this point, the HA 420 may insert a session ID of the MN 400 into the MIP registration reply message. For example, the HA 420 may copy an IdLow field value of the MIP registration request message provided from the FA 410 to an IdLow field value of the MIP registration reply message.

When the MIP registration reply message is received from the HA 420, the FA 410 may determine the MN corresponding to the MIP registration reply message by determining the session ID included in the MIP registration reply message in step 441. For example, the FA 410 may determine the session ID from the IdLow field of the MIP registration reply message. The FA 410 may recognize the MN corresponding to the NAI to which the session ID is assigned as an MN corresponding to the MIP registration reply message.

In the case where the MN corresponding to the MIP registration reply message is the MN 400, the FA 410 may include an IP address assigned to the MN 400 in a DHCP offer message and may transmit the DHCP offer message to the MN 400 in step 443. Here, the assigned IP address may be a care-of-address.

When the DHCP offer message is received, the MN 400 may determine the IP address assigned by the FA 410 from the DHCP offer message. The MN 400 may transmit a DHCP request message to the FA 410 in order to confirm the assigned IP address in step 445.

When the DHCP request message is received, the FA 410 may transmit a DHCP ACKnowledgement (ACK) message to the MN 400 in response to the DHCP request message in step 447.

As described above, the FA may transmit the MIP registration request message including the session ID of the MN which has requested registration to the HA. For example, the FA may generate an MIP registration request message including the session ID of the MN as illustrated in FIGS. 5A and 5B.

FIGS. 5A and 5B illustrate the construction of a registration request signal in a wireless communication system according to exemplary embodiments of the present invention.

FIG. 5A illustrates the construction of an MIP registration request message, and FIG. 5B illustrates a registration request field of the MIP registration request message.

As illustrated in FIG. 5A, the MIP registration request message may include an IP header field 500 including IP information of a destination to which an FA is to transmit an MIP registration request message, a User Datagram Protocol (UDP) header field 510 including UDP information of a destination to which an FA is to transmit an MIP registration request message, a registration request field 520 including information of an MN which requests registration, an NAI extension field 530 including an NAI of an MN which requests registration, and an additional information field 540 including additional information regarding an MN which requests registration.

As illustrated in FIG. 5B, the registration request field 520 may include home address information 550 of an MN which requests registration, HA information 560 of the MN, care-of-address information 570 for the MN to communicate with an FA, and time information 580 of the MIP registration request message.

The time information may be divided into an IdHigh field and an IdLow field.

The IdHigh field may include time information in units of seconds for determining whether the MIP registration request message can be used.

The IdLow field may include time information for discriminating MIP registration request messages having the same IdHigh field, and a session ID of an MN that requests registration. Here, the time information included in the IdLow field may include time information of '1' second or less for discriminating MIP registration request messages having the same IdHigh field, transmitted by the same MN.

As described above, when the FA transmits an MIP registration request message including the session ID of an MN which has requested registration, an HA may transmit an MIP registration reply message including the same session ID as that included in the MIP registration request message to the FA. For example, the HA may generate an MIP registration reply message including the same session ID as that included in an MIP registration request message as illustrated in FIGS. 6A and 6B.

FIGS. 6A and 6B illustrate the construction of a registration reply signal in a wireless communication system according to exemplary embodiments of the present invention.

FIG. 6A illustrates the construction of an MIP registration reply message, and FIG. 6B illustrates the construction of a registration reply field forming the MIP registration reply message.

As illustrated in FIG. 6A, the MIP registration reply message may include an IP header field 600 including IP information of a destination to which an HA is to transmit an MIP registration reply message, a UDP header field 610 including UDP information of a destination to which an HA is to transmit an MIP registration reply message, a registration reply field 620 including registration reply information regarding an MN which has requested registration, an NAI extension field 630 including an NAI of an MN which has requested registration, and an additional information field 640 including additional information regarding an MN which has requested registration.

As illustrated in FIG. 6B, the registration reply field 620 may include home address information 650 of an MN which has requested registration, HA information 660 of the MN, and time information 670 of the MIP registration reply message.

The time information may be divided into an IdHigh field and an IdLow field.

The IdLow field may be set to the same value as an IdLow field included in an MIP registration request message provided from an FA. That is, an HA may copy the IdLow field value of the MIP registration request message to the IdLow field of the MIP registration reply message.

The IdHigh field may include a value that is determined depending on whether an MIP registration request message provided from an FA is usable. For example, when a difference between a time of an IdHigh field included in an MIP registration request message provided from an FA and a local time of an HA does not exceed a reference value, the HA may determine that the MIP registration request message is usable. In this case, the HA may copy the value of the IdHigh field of the MIP registration request message to the IdHigh field of the MIP registration reply message.

When a difference between a time of an IdHigh field included in an MIP registration request message provided from an FA and a local time of an HA exceeds a reference value, the HA may determine that the MIP registration request message is not usable. In this case, the HA may insert the local time of the HA into the IdHigh field of the MIP registration reply message so that the FA can re-transmit an MIP registration request message with consideration of the local time of the HA.

As described above, IdHigh field values of an MIP registration request message and an MIP registration reply message may change. However, IdLow fields of the MIP registration request message and the MIP registration reply message may have the same value. Accordingly, the FA may insert a session ID of an MN which requests registration into an IdLow field of an MIP registration request message, and may transmit the message to the HA. The FA may easily determine the session ID of the MN which has requested registration from an IdLow field of an MIP registration reply message provided from the HA. At this point, the FA may insert the session ID of the MN into the IdLow field of the MIP registration request message as illustrated in FIGS. 7A and 7B.

FIGS. 7A and 7B illustrate the construction of an IdLow field in a wireless communication system according to exemplary embodiments of the present invention.

An FA may insert a session ID into an IdLow field as illustrated in FIG. 7A or 7B.

First, the FA may insert a session ID into a predefined region in the rear end of an IdLow field as illustrated in FIG. 7A. At this point, the FA may determine the size of the session ID depending on the maximum number of MNs for which a service can be supported by the FA. That is, the FA may extend the size of a session ID depending on the number of MNs for which the service can be supported.

In addition, the FA may arbitrarily determine the position of a session ID and may insert the session ID into an IdLow field as illustrated in FIG. 7B.

In addition, though not illustrated, the FA may insert the session ID into a predefined region in the front end of an IdLow field.

An IdLow field of an MIP registration request message transmitted from an FA to an HA should include a greater value than that of an IdLow field of a previous MIP registration request message. Accordingly, the FA assigns a greater value than that of a previously assigned session ID as a value of a session ID to be assigned to an NAI of an MN.

As described above, an FA of a wireless communication system which uses an MIP may insert a session ID of a relevant MN into an IdLow field of a registration request message from the MN, and may transmit the message, so that the FA may easily search for an MN corresponding to a registration reply message provided from an HA, and may reduce memory consumption and a time delay that occurs due to a hash method.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for setting up a session at a Foreign Agent (FA) of a wireless communication system that uses a Mobile Internet Protocol (MIP), the method comprising:
   determining, by the FA, a Network Access Identifier (NAI) of a Mobile Node (MN), when at least one MN requests registration;
   assigning, by the FA, a session Identification (ID) to the NAI of the MN;
   inserting, by the FA, the session ID assigned to the NAI into an Identification Low field forming a registration request field of a message requesting registration of the MN;
   transmitting, by the FA, the message to a Home Agent (HA) of the MN;
   determining, by the FA, an MN to which registration information included in a registration reply message is to be transmitted using the session ID included in an Identification Low field forming a registration reply field of the registration reply message, when the registration reply message is received from the HA; and
   transmitting the registration information to the determined MN,
   wherein the Identification Low field comprises the session ID of the MN and time information for discriminating at least two messages comprising a same Identification High field.

2. The method of claim 1, wherein the determining of the NAI comprises, determining the NAI of the MN included in a MIP registration request message, when the MIP registration request message is received from the MN.

3. The method of claim 1, wherein the determining of the NAI comprises, determining the NAI of the MN from an Authentication Authorization and Accounting (AAA) server, when a Dynamic Host Configuration Protocol (DHCP) discover message is received from the MN.

4. The method of claim 1, wherein a size of the session ID inserted into the Identification Low field is determined based on the number of MNs for which an MIP service is supported by the FA.

5. The method of claim 1, wherein the transmitting of the registration information comprises:
   transmitting a Dynamic Host Configuration Protocol (DHCP) offer message comprising an Internet Protocol (IP) address assigned to the MN; and
   transmitting a reply message to a message requesting confirmation of the IP address assignment to the MN, when a message requesting confirmation of the IP address assignment is received from the MN.

6. The method of claim 5, wherein the IP address comprises a care of address for the MN.

7. A wireless communication system that uses a Mobile Internet Protocol (MIP), for performing a session setup, the system comprising:
   a Foreign Agent (FA) for inserting a session Identification (ID) assigned to a Network Access Identifier (NAI) into an Identification Low field forming a registration request field of a message requesting registration of a Mobile Node (MN), when at least one MN requests registration, for assigning a session ID to an NAI of the MN, and for transmitting the message to a Home Agent (HA); and
   the HA for performing a binding cache for the MN according to registration request information of the MN included in the message provided from the FA, for inserting the session ID of the MN into an Identification Low field forming a registration reply field of a message including registration information of the MN, and for transmitting the message to the FA,
   wherein the FA determines the MN to which the registration information included in the message is to be transmitted using the session ID inserted into the Identification Low field forming the registration reply field of the message comprising the registration information provided from the HA, and transmits the registration information to the determined MN, and
   wherein the FA generates the Identification Low field such that the Identification Low field comprises the session ID assigned to the NAI and time information for discriminating at least two messages comprising a same Identification High field.

8. The system of claim 7, wherein, when an MIP registration request message is received from the MN, the FA determines the NAI of the MN included in the MIP registration request message.

9. The system of claim 7, wherein the FA determines the NAI of the MN from an Authentication Authorization and Accounting (AAA) server, when a Dynamic Host Configuration Protocol (DHCP) discover message is received from the MN.

10. The system of claim 7, wherein the FA determines a size of the session ID inserted into the Identification Low field based on the number of MNs for which an MIP service is supported by the FA.

11. The system of claim 7, wherein the HA copies a value of the Identification Low field included in the message provided from the FA to the Identification Low field forming the registration reply field, and transmits the same to the FA.

12. The system of claim 7, wherein the FA transmits the registration information comprising an Internet Protocol (IP) address to the determined MN.

13. The system of claim 12, wherein the registration information is transmitted in a Dynamic Host Configuration Protocol (DHCP) offer message.

14. The system of claim 7, further comprising an MN for transmitting, to the FA, a message for requesting confirmation of assignment of an Internet Protocol (IP) address included in the registration information provided from the FA, wherein the FA transmits a reply message to the message requesting confirmation of the assignment of the IP address and received from the MN, to the MN.

* * * * *